United States Patent
Eto

(10) Patent No.: US 8,120,328 B2
(45) Date of Patent: Feb. 21, 2012

(54) CHARGING SYSTEM, CHARGING CONTROL PROGRAM, AND PORTABLE TERMINAL

(75) Inventor: Yasutaka Eto, Tokyo (JP)

(73) Assignee: NEC Corporation, Tokyo (JP)

( * ) Notice: Subject to any disclaimer, the term of this patent is extended or adjusted under 35 U.S.C. 154(b) by 682 days.

(21) Appl. No.: 12/293,875

(22) PCT Filed: Mar. 22, 2007

(86) PCT No.: PCT/JP2007/000278
§ 371 (c)(1),
(2), (4) Date: Sep. 22, 2008

(87) PCT Pub. No.: WO2007/122787
PCT Pub. Date: Nov. 1, 2007

(65) Prior Publication Data
US 2009/0121685 A1    May 14, 2009

(30) Foreign Application Priority Data
Mar. 24, 2006   (JP) ................. 2006-082861

(51) Int. Cl.
*H02J 7/04* (2006.01)
*H02J 7/16* (2006.01)
(52) U.S. Cl. ...................................... 320/150
(58) Field of Classification Search ........... 320/150–153
See application file for complete search history.

(56) References Cited

U.S. PATENT DOCUMENTS

| | | | | |
|---|---|---|---|---|
| 5,656,917 A | * | 8/1997 | Theobald | 320/150 |
| 6,204,639 B1 | * | 3/2001 | Takano et al. | 320/150 |
| 6,204,641 B1 | * | 3/2001 | Sakakibara | 320/153 |
| 2007/0222419 A1 | * | 9/2007 | Wolf et al. | 320/150 |

FOREIGN PATENT DOCUMENTS

| | | |
|---|---|---|
| JP | 2000156939 A | 6/2000 |
| JP | 2000358836 A | 12/2000 |
| JP | 2001136675 A | 5/2001 |
| JP | 2002058174 A | 2/2002 |

OTHER PUBLICATIONS

Machine Translation for JP 2000358336.*
Machine Translation for JP 2000156939.*
International Search Report for PCT/JP2007/000278 mailed May 15, 2007.

* cited by examiner

*Primary Examiner* — Ramy Ramadan

(57) ABSTRACT

A charging system of the present invention is a charging system for charging a battery mounted on a portable telephone 100, and includes a charging control unit 174 that performs supply and control of the charging electric current and the charging voltage to the battery, a device temperature monitoring unit 170 that monitors the device temperature inside the portable telephone 100, and a battery temperature monitoring unit 172 that monitors the battery temperature of the battery. The charging control unit 174 controls the charging electric current to be supplied to the battery according to the device temperature monitored by the device temperature monitoring unit 170 and controls the charging voltage to be supplied to the battery according to the battery temperature monitored by the battery temperature monitoring unit 172.

23 Claims, 7 Drawing Sheets

(a)

(b)

CHARGING SYSTEM, CHARGING CONTROL PROGRAM, AND PORTABLE TERMINAL

TECHNICAL FIELD

The present invention relates to a charging system, and more particularly to a charging system and a charging control program for charging a battery mounted on a portable terminal as well as to a portable terminal.

BACKGROUND ART

In a portable terminal device such as a portable telephone, a PHS (Personal Handy phone System), or PDA (Personal Data Assistance, Personal Digital Assistants: portable-type information communication equipment for individual persons), the number of support functions tends to increase. Therefore, in order to meet the increasing number of functions, a lithium ion battery realizing a capacity growth and a miniaturization is being developed.

There is a related art of a charging system, for example, disclosed in a patent document 1. The battery charging system disclosed in the above document is such that the ambient temperature of an electrical storage device is sensed, and the full-charging voltage at the time of completion of charging the battery is changed in accordance with the ambient temperature. Further, it is so constructed that, when the voltage of the battery exceeds the full-charging voltage, the charging of the battery is stopped.

Also, a related art of a battery charging system disclosed in a patent document 2 is such that the temperature of the battery is sensed, and an attainment target temperature of the battery is changed in accordance with the sensed temperature, and the charging electric current is changed in accordance with the changed attainment target temperature. This charging system is so constructed that, when the temperature of the battery exceeds the attainment target temperature, the charging of the battery is stopped.

Patent Document 1: Japanese Laid-open Patent Publication No. 2002-58174
Patent Document 2: Japanese Laid-open Patent Publication No. 2001-136675

DISCLOSURE OF THE INVENTION

In the meantime, in recent years, the batteries applied to such as a portable terminal has a capacity becoming larger. Here, device temperature rise caused by synergistic effects of the temperature rise due to heat generation from a wireless circuit unit and a CPU having an increased operation clock and circuit scale and the temperature rise due to the charging electric current of the charging circuit becomes a problem. Therefore, restriction has to be constantly made even on the charging electric current that can restrain the temperature rise. Also, as an adverse effect caused by the restriction on the charging electric current, there is a problem of longer period of time for charging. Further, by raising the charging voltage, the capacity of the battery can be raised, and the capacity that can be used by a user can be then increased; however, by charging at a high voltage when the battery is at a high temperature, there is a problem such that the degradation of the battery characteristics such as a shorter lifetime of the battery occurs.

The present invention has been made in view of the above-described circumstances, and an object thereof is to provide a charging system that restrains the degradation of the battery characteristics.

According to the present invention, there is provided a charging system for charging a battery mounted on a portable terminal, including:

a charging control unit that performs supply and control of a charging electric current and a charging voltage to the battery;

a first temperature monitoring unit that monitors a device temperature inside the portable terminal; and a second temperature monitoring unit that monitors a battery temperature of the battery, wherein the charging control unit controls the charging electric current to be supplied to the battery according to the device temperature monitored by the first temperature monitoring unit and controls the charging voltage to be supplied to the battery according to the battery temperature monitored by the second temperature monitoring unit.

According to the present invention, by monitoring the temperature of the device and the battery which is one of causal factors of the degradation of the battery characteristics, the temperature rise of the charging circuit and the battery can be restrained by controlling the charging electric current, and also the degradation of the battery characteristics can be restrained by controlling the charging voltage.

The aforementioned charging system may include a temperature-corresponding voltage value storing unit that stores voltage values in correspondence with a plurality of set temperatures of the battery temperature, wherein the charging control unit may obtain, from the temperature-corresponding voltage value storing unit, a voltage value corresponding to the battery temperature monitored by the second temperature monitoring unit, so as to control the charging voltage to be supplied to the battery.

The aforementioned charging system may include a temperature-corresponding electric current value storing unit that stores electric current values in correspondence with a plurality of set temperatures of the device temperature, wherein the charging control unit may obtain, from the temperature-corresponding electric current value storing unit, an electric current value corresponding to the device temperature monitored by the first temperature monitoring unit, so as to control the charging electric current to be supplied to the battery.

The aforementioned charging system may include a timer that monitors lapse of a predetermined period of time, wherein the temperature-corresponding electric current value storing unit may store the plurality of set temperatures of the device temperature including a first set temperature and a second set temperature lower than the first set temperature, and a first electric current value and a second electric current value respectively corresponding to the first set temperature and the second set temperature; the first temperature monitoring unit may monitor the device temperature each time the predetermined period of time monitored by the timer passes; and the charging control unit may make access to the temperature-corresponding electric current value storing unit, may supply to the battery a charging electric current of the second electric current value for each cycle of lapse of the predetermined period of time of the timer when the device temperature is lower than or equal to the second set temperature, may supply to the battery a charging electric current of the first electric current value for every other cycle of lapse of the predetermined period of time of the timer when the device temperature is lower than the first set temperature and higher than the second set temperature, and may stop supply of the charging electric current when the device temperature is higher than or equal to the first set temperature.

The aforementioned charging system may include a timer that monitors lapse of a predetermined period of time, wherein the temperature-corresponding electric current value storing unit may store a plurality of electric current values respectively corresponding to the plurality of set temperatures of the device temperature, and may include cycle numbers of lapse of the predetermined period of time of the timer respectively corresponding to the plurality of set temperatures; the first temperature monitoring unit may monitor the device temperature each time the predetermined period of time monitored by the timer passes; and the charging control unit may make access to the temperature-corresponding electric current value storing unit, may obtain an electric current value of the charging electric current and a cycle number according to the set temperature corresponding to the device temperature, and may control to perform or stop supply of the charging electric current of the electric current value to the battery each for the cycle number.

In the aforementioned charging system, the battery may be a lithium ion battery.

According to the present invention, there is provided a charging control program for controlling a charging circuit that charges a battery mounted on a portable terminal, the charging control program allowing a computer to function as: means for monitoring a device temperature inside the portable terminal; means for monitoring a battery temperature of the battery; means for controlling a charging electric current to be supplied to the battery according to the device temperature monitored by the means for monitoring the device temperature; and means for controlling a charging voltage to be supplied to the battery according to the battery temperature monitored by the means for monitoring the battery temperature.

According to the present invention, there is provided a portable terminal including a housing in which electronic components are incorporated; a battery that is provided in the housing; a charging circuit capable of supplying a charging electric current and a charging voltage to the battery; a charging control unit that controls execution and stoppage of charging the battery using the charging circuit; a first temperature sensor that senses an inside temperature of the housing; and a second temperature sensor that senses a battery temperature of the battery, wherein the charging control unit adjusts the charging electric current to be supplied to the battery according to a first temperature sensed by the first temperature sensor, and adjusts the charging voltage to be supplied to the battery according to a second temperature sensed by the second temperature sensor.

It is to be noted that any arbitrary combination of the above-described constitutional elements, and any objects obtained by converting the expression of the present invention among method, apparatus, system, recording medium, computer program and so forth are effective as exemplary embodiments of the present invention.

According to the present invention, there is provided a charging system that restrains the degradation of the battery characteristics.

BRIEF DESCRIPTION OF THE DRAWINGS

The above and other objects, advantages and features of the exemplary embodiments will be more apparent from the following description taken in conjunction with the accompanying drawings.

BEST MODE FOR CARRYING OUT THE INVENTION

Figure 1:
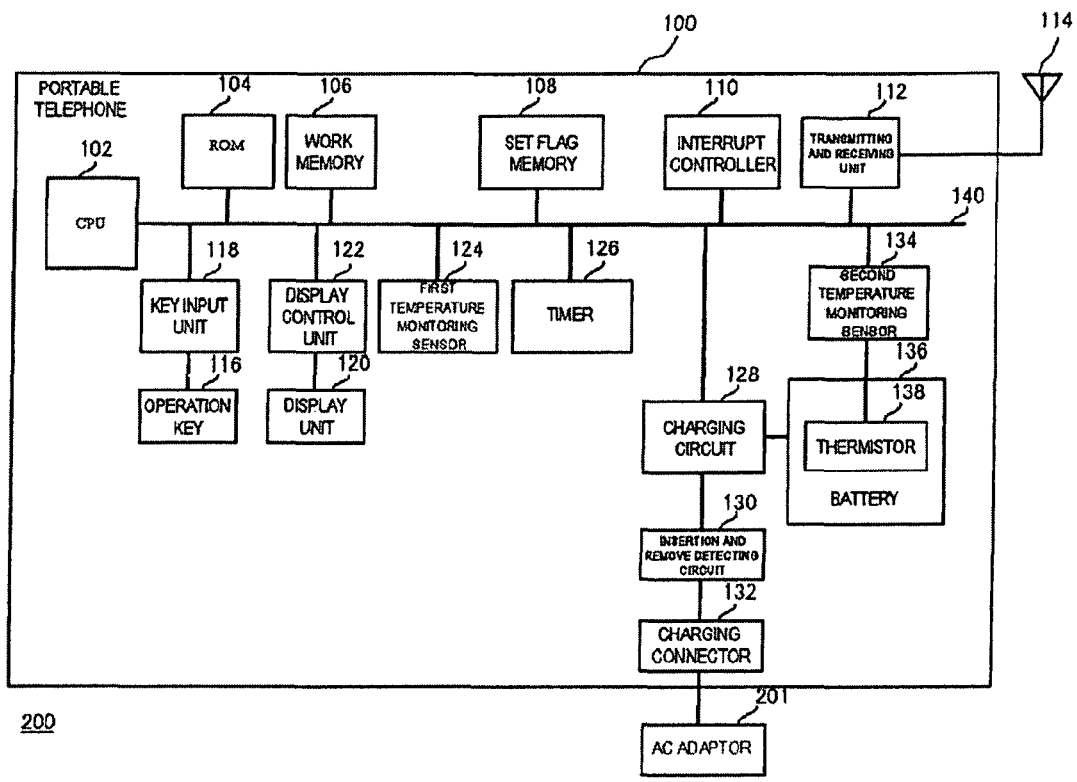
FIG. 1 is a block diagram showing a construction of a charging system according to an exemplary embodiment of the present invention.

Hereafter, exemplary embodiments of the present invention will be described referring to the attached drawings. It is to be noted that any similar constitutional elements in all of the drawings will be given with similar reference numerals, so as to appropriately avoid repetitive explanation.

Figure 2:
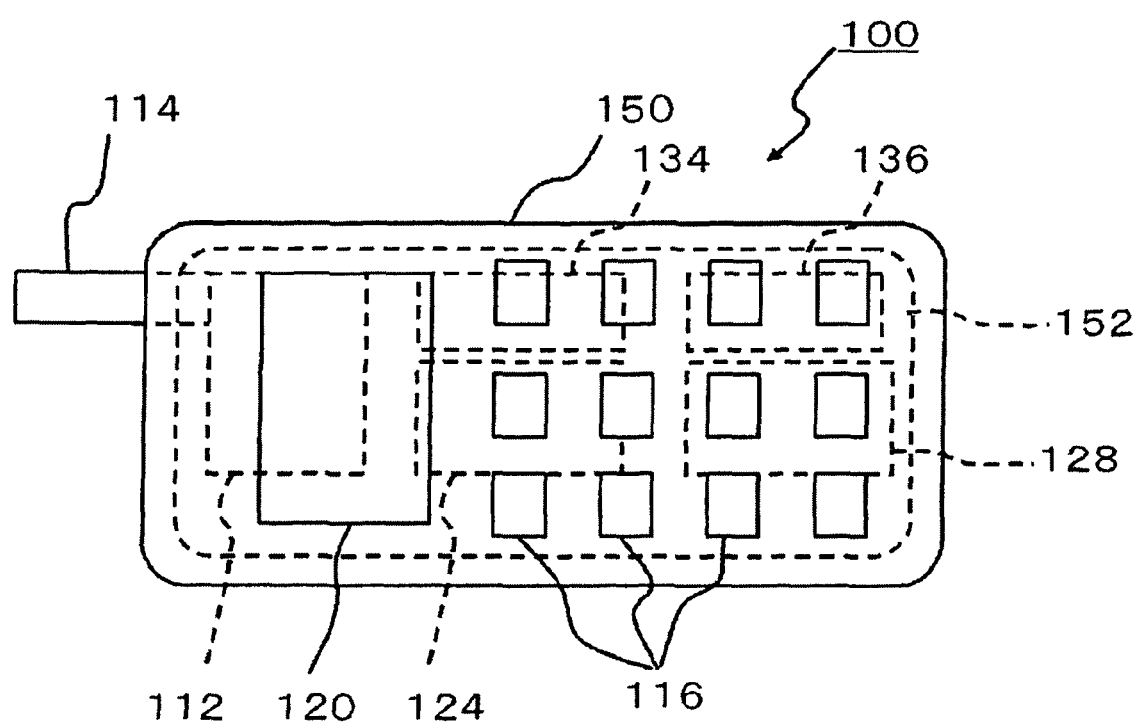
FIG. 2 is a top surface view illustrating a portable telephone of the present exemplary embodiment.
Figure 3:
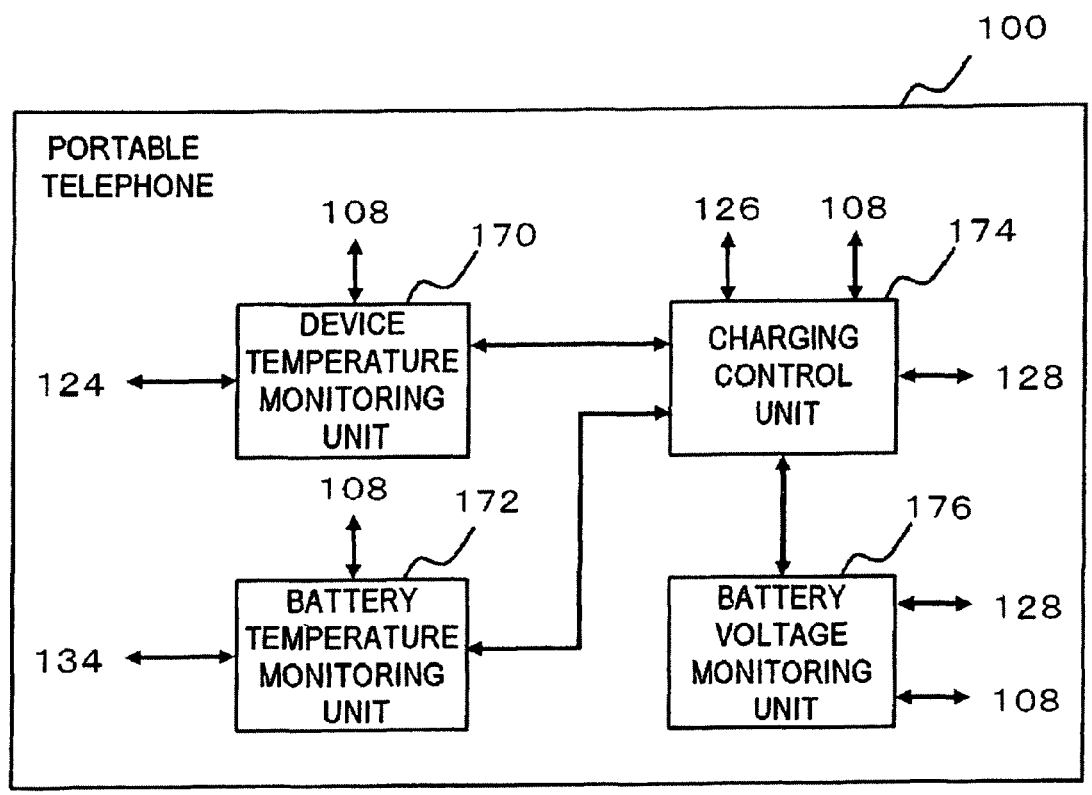
FIG. 3 is a functional block diagram showing a charging control function in the portable telephone of the present exemplary embodiment.

FIG. 1 is a block diagram showing a construction of a charging system 200 according to an exemplary embodiment of the present invention. FIG. 2 is a top surface view illustrating a portable telephone of the present exemplary embodiment. FIG. 3 is a functional block diagram showing a charging control function in the portable telephone 100 of the present exemplary embodiment.

The charging system 200 of the present exemplary embodiment is a charging system 200 for charging a battery 136 mounted on a portable terminal (the portable telephone 100), including a charging control unit 174 that performs supply and control of a charging electric current and a charging voltage to the battery 136, a first temperature monitoring unit (a first temperature monitoring sensor 124, a device temperature monitoring unit 170) that monitors a device temperature inside the portable terminal (the portable telephone 100), and a second temperature monitoring unit (a thermistor 138, a second temperature monitoring sensor 134, a battery temperature monitoring unit 172) that monitors a battery temperature of the battery 136, wherein the charging control unit 174 controls the charging electric current to be supplied to the battery 136 according to the device temperature monitored by the first temperature monitoring unit (the device temperature monitoring unit 170) and controls the charging voltage to be supplied to the battery according to the battery temperature monitored by the second temperature monitoring unit (the battery temperature monitoring unit 172).

Also, the portable telephone 100 of the present exemplary embodiment includes a housing 150 in which electronic components are incorporated, a battery 136 that is provided in the housing 150, a charging circuit 128 capable of supplying a charging electric current and a charging voltage to the battery 136, a charging control unit 174 that controls execution and stoppage of charging the battery 136 using the charging circuit 128, a first temperature sensor (a first temperature monitoring sensor 124) that senses an inside temperature of the housing 150, and a second temperature sensor (a thermistor 138, a second temperature monitoring sensor 134) that senses a battery temperature of the battery 136, wherein the charging control unit 174 adjusts the charging electric current to be supplied to the battery according to a first temperature sensed by the first temperature sensor (the first temperature monitoring sensor 124), and adjusts the charging voltage to be supplied to the battery 136 according to a second temperature sensed by the second temperature sensor (the thermistor 138, the second temperature monitoring sensor 134).

Specifically, as shown in FIG. 1, the portable telephone 100 includes a CPU (Central Processing Unit) 102, a ROM (Read Only Memory) 104, a work memory 106, a set flag memory 108, an interrupt controller 110, a transmitting and receiving unit 112, an antenna 114, operation key 116, a key input unit 118, a display unit 120, a display control unit 122, a first temperature monitoring sensor 124, a timer 126, a charging circuit 128, an insertion and remove detecting circuit 130, a charging connector 132, a second temperature monitoring sensor 134, a battery 136, and a thermistor 138. The CPU 102, the ROM 104, the work memory 106, the set flag memory 108, the interrupt controller 110, the transmitting and receiving unit 112, the key input unit 118, the display control unit 122, the first temperature monitoring sensor 124, the timer 126, the charging circuit 128, and the second temperature monitoring sensor 134 are connected with each other by a bus 140.

Here, the charging system 200 of the present exemplary embodiment is provided with an AC adaptor 201 having a function of generating a charging electric current from an AC power source (not shown) and supplying the charging electric current to the portable telephone 100.

Here, in the present exemplary embodiment, description of the portable telephone 100 will be made as an example of the portable terminal. However, the present invention will not be limited thereto. For example, the portable terminal may include portable terminal devices such as a PHS, a PDA, or a portable-type personal computer. Here, in each of the drawings, the construction not related to the essentials of the present invention has not been described.

Also, each of the constitutional elements of the charging system 200 is realized by arbitrary combination of hardware and software including a CPU of an arbitrary computer, a memory, a program stored in the memory for realizing the constitutional elements of the present drawing, a storage unit such as a hard disk that stores the program, and an interface for connection to the network as central cores. Further, those skilled in the art will understand that various modifications can be made on the realizing methods and devices thereof. Each drawing described below shows a block of a functional unit rather than a construction of a hardware unit.

The portable telephone 100 of the present exemplary embodiment stores, in the ROM 104, a charging control program according to an exemplary embodiment of the present invention. By execution of this charging control program by the CPU 102, the charging system 200 of the present invention will be realized.

The charging control program of the present exemplary embodiment is a charging control program for controlling a charging circuit 128 that charges a battery 136 mounted on a portable terminal (the portable telephone 100), the charging control program allowing a computer (a CPU 102) to function as means (the first temperature monitoring sensor 124, the device temperature monitoring unit 170) for monitoring a device temperature inside the portable terminal (the portable telephone 100), means (the thermistor 138, the second temperature monitoring sensor 134, the battery temperature monitoring unit 172) for monitoring a battery temperature of the battery 136, means (the charging control unit 174) for controlling a charging electric current to be supplied to the battery 136 according to the device temperature monitored in the means for monitoring the device temperature (the first temperature monitoring sensor 124, the device temperature monitoring unit 170), and means (the charging control unit 174) for controlling a charging voltage to be supplied to the battery 136 according to the battery temperature monitored by the means for monitoring the battery temperature (the thermistor 138, second temperature monitoring sensor 134, battery temperature monitoring unit 172).

The CPU 102 executes various control programs and the above-described charging control program. The CPU 102 is connected to each constitutional element via the bus 140, and controls the whole device together with each constitutional element.

The ROM 104 is a non-volatile memory, and stores various programs and data needed for operating the portable telephone 100, including the above-described charging control program.

The work memory 106 is a RAM (Random Access Memory) and stores programs and data temporarily needed for execution of various programs by the CPU 102. The set flag memory 108 is, for example, a flash memory, and stores temperature, electric current, and voltage parameters for determining the charging electric current as well as various flags. Details of the set flag memory 108 will be described later.

The interrupt controller 110 is a circuit for generating an interrupt to the CPU 102 in accordance with the connection between the charging connector 132 and the AC adaptor 201 that is detected by the later-mentioned insertion and remove detecting circuit 130.

The transmitting and receiving unit 112 is a circuit for transmitting and receiving data wirelessly via the antenna 114.

The operation key 116 are provided on an operation panel surface (not shown) of the housing 150 (FIG. 2) of the portable telephone 100, and are supposed to be operated by the user. For example, the operation key 116 may include buttons, keys, switches, touch panels, dials and so on. The key input unit 118 is an input circuit that accepts operation of the operation key 116.

The display unit 120 is provided on the operation panel surface of the housing 150 of the portable telephone 100, and is a display device such as a black and white or color liquid crystal panel, an organic EL (Electronic Luminescence), or the like. The display control unit 122 is a control circuit for controlling display of the display unit 120.

The first temperature monitoring sensor 124 is a sensor circuit that converts the device temperature into digital data, and measures the device temperature to convert it into digital data for output. As shown in FIG. 2, by placing the first temperature monitoring sensor 124 between the transmitting and receiving unit 112 and the charging circuit 128 which are heat generating bodies in the portable telephone 100, the device temperature can be monitored accurately. The timer 126 measures the lapse of time in accordance with the set time, and informs the CPU 102 of the time-up. In the present exemplary embodiment, the charging cycle is controlled by this timer 126.

The charging circuit 128 is a circuit for charging the later-mentioned battery 136, and is a circuit that receives supply of a charging electric current from the AC adaptor 201 via the charging connector 132 so as to execute or stop supply of the charging electric current and the charging voltage to the battery 136 and to switch the charging electric current value and the charging voltage value.

The insertion and remove detecting circuit 130 detects insertion or withdrawal of the AC adaptor 201 into or from the charging connector 132 of the portable telephone 100, and informs the interrupt controller 110 to generate an interrupt. The charging connector 132 is adapted to connecting the AC adaptor 201 to the portable telephone 100.

The second temperature monitoring sensor 134 is a sensor circuit that converts the temperature of the battery 136 into digital data, is connected to the thermistor 138 mounted on the later-mentioned battery 136, and measures the temperature of the battery 136 so as to convert it into digital data for output. By being connected to the thermistor 138 within the battery 136, the second temperature monitoring sensor 134 can monitor the temperature of the battery 136. The battery 136 will be a power supply source for operating the internal circuits of the portable telephone 100. In the present exemplary embodiment, the battery 136 is a lithium ion battery.

Next, the construction of the essential parts of the present exemplary embodiment will be described with use of FIG. 3. The portable telephone 100 includes a device temperature monitoring unit 170, a battery temperature monitoring unit 172, a charging control unit 174, and a battery voltage monitoring unit 176.

Figure 4:
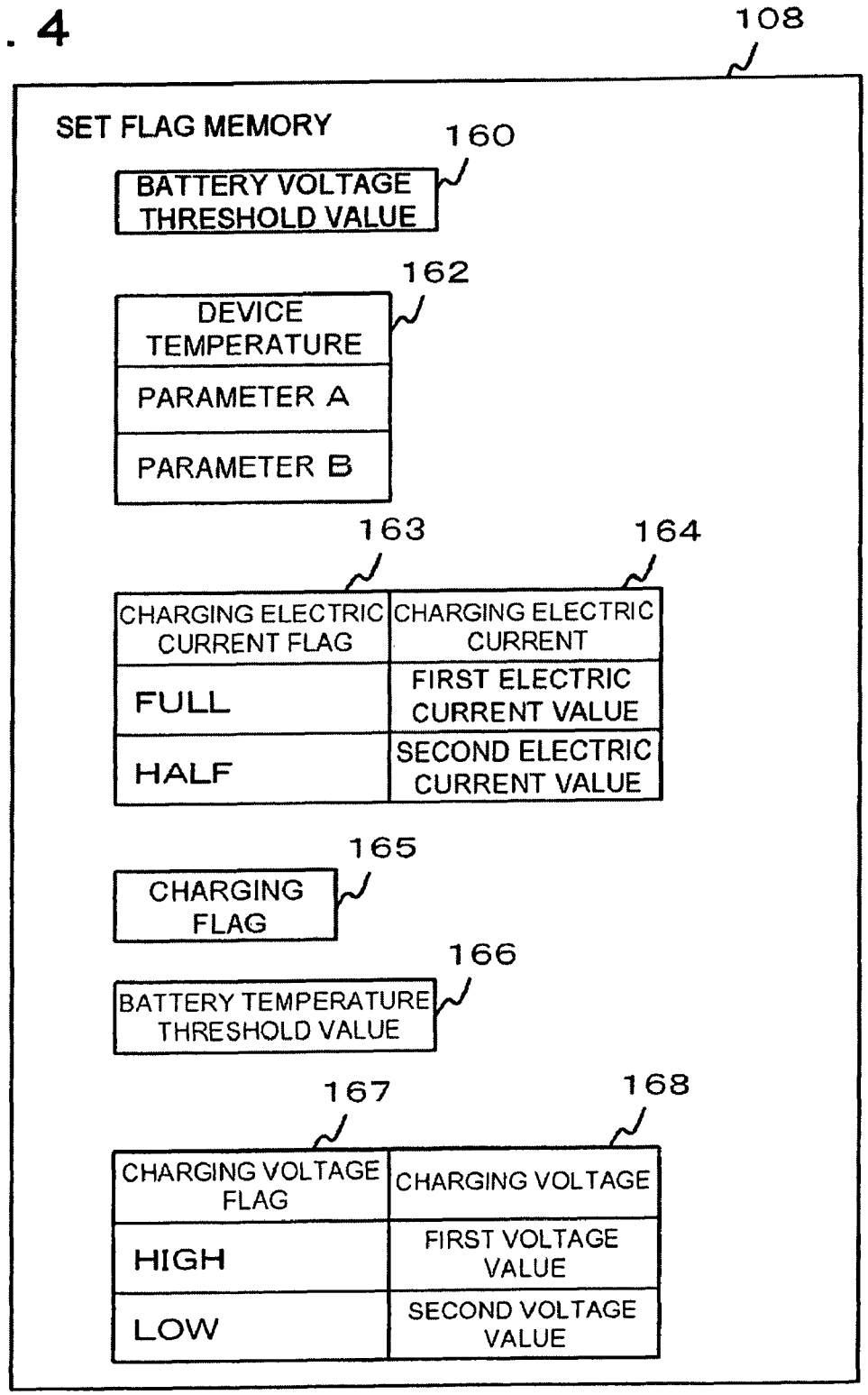
FIG. 4 is a view showing one example of a structure of a set flag memory of the present exemplary embodiment.

The device temperature monitoring unit 170 monitors the device temperature inside the portable telephone 100. Specifically, the device temperature monitoring unit 170 receives input of the digital data of the device temperature that has been output from the first temperature monitoring sensor 124, makes access to the set flag memory 108, compares it with the set values of the device temperature, and informs the charging control unit 174. Here, details of the set flag memory 108 will be described with use of FIG. 4. Here, the example shown in FIG. 4 is merely one example, so that the present invention is not limited thereto.

The set flag memory 108 includes a battery voltage threshold value 160, a device temperature 162, a charging electric current flag 163, charging electric current 164 corresponding to the conditions of the charging electric current flag 163, a charging flag 165, a battery temperature threshold value 166, a charging voltage flag 167, and charging voltage 168 corresponding to the conditions of the charging voltage flag 167.

The battery voltage threshold value 160 stores a threshold value that is used for judging whether or not the voltage of the battery 136 is a voltage that needs charging. The battery voltage monitoring unit 176 monitors the voltage of the battery 136 and instructs the charging circuit 128 not to perform charging when the voltage of the battery 136 is higher than or equal to the battery voltage threshold value 160 of the set flag memory 108. When the voltage of the battery 136 is lower than the battery voltage threshold value 160, the battery voltage monitoring unit 176 instructs the charging circuit 128 to perform the process of charging the battery 136 by controlling the charging electric current and the charging voltage in accordance with the device temperature and the battery temperature.

The device temperature 162 includes parameters of a plurality of set temperatures, here, two set temperatures. The device temperature monitoring unit 170 makes reference to the device temperature 162 in the set flag memory 108, and compares the device temperature sensed by the first temperature monitoring sensor 124 with the parameter A and the parameter B that are stored in the device temperature 162. Here, in the present exemplary embodiment, the parameter A is a set temperature higher than the parameter B. The parameter A will be a threshold value for stopping the charging, and the parameter B will be a threshold value for switching the charging speed (high speed or low speed).

The charging electric current flag 163 is set to either condition of FULL or HALF. The device temperature monitoring unit 170 sets the charging electric current flag 163 to HALF when the device temperature is lower than the parameter A and higher than the parameter B. Also, the device temperature monitoring unit 170 sets the charging electric current flag 163 to FULL when the device temperature is lower than or equal to the parameter B.

The charging electric current 164 stores the charging electric current values including a first electric current value and a second electric current value respectively corresponding to the conditions FULL and HALF that are set in the charging electric current flag 163. Here, first electric current value is a value higher than the second electric current value. Namely, when the charging electric current flag 163 is set to FULL, the charging control unit 174 instructs the charging circuit 128 so that the charging electric current to be supplied to the battery 136 will be the first electric current value. When the charging electric current flag 163 is set to HALF, the charging control unit 174 instructs the charging circuit 128 so that the charging electric current to be supplied to the battery 136 will be the second electric current value.

When the charging electric current flag 163 is set to HALF, the charging flag 165 sets and resets the flag alternately for each one process of charging. By this process, the charging flag 165 is set or reset for each one cycle of charging. When the charging electric current flag is set to HALF, the charging control unit 174 further makes reference to the flag of the charging flag 165 and, when the flag is set, the charging control unit 174 judges that the charging was done at the last time and waits for the next cycle without performing the charging for this time. At this time, the charging flag 165 is reset. Further, when the charging electric current flag 163 is set to HALF, the charging control unit 174 makes reference to the flag of the charging flag 165 and, when the flag is reset, the charging control unit 174 judges that the charging was not done at the last time, and instructs the charging circuit 128 to perform the charging. Then, the charging flag 165 is set.

The battery temperature threshold value 166 stores the threshold value of the battery temperature that is monitored by the battery temperature monitoring unit 172. The battery temperature monitoring unit 172 receives input of the digital data of the battery temperature that has been output from the second temperature monitoring sensor 134, and compares it with the battery temperature threshold value 166 of the set flag memory 108. When the battery temperature is lower than the battery temperature threshold value 166, it is a state in which the charging voltage can be set to be high, whereas when the battery temperature is higher than or equal to the battery temperature threshold value 166, the charging voltage is set to be low.

The charging voltage flag 167 is set to HIGH when the battery temperature is judged to be lower than the battery temperature threshold value 166 in the above-described judgment of the battery temperature threshold value 166 in the battery temperature monitoring unit 172. On the other hand, when the battery temperature is judged to be higher than or equal to the battery temperature threshold value 166, the charging voltage flag 167 is set to LOW. The charging voltage 168 stores a first voltage value and a second voltage value respectively corresponding to conditions HIGH and LOW of the charging voltage flag 167. Here, the first voltage value is a value set to be higher than the second voltage value.

Namely, the battery temperature monitoring unit 172 sets the charging voltage to be the second voltage value when the battery temperature is higher than or equal to the battery temperature threshold value 166 (when the charging voltage flag 167 is LOW), while sets the charging voltage to be the first voltage value when the battery temperature is lower than the battery temperature threshold value 166 (when the charging voltage flag 167 is HIGH).

Returning to FIG. 3, the battery temperature monitoring unit 172 monitors the battery temperature of the battery 136. Specifically, as described above, the battery temperature monitoring unit 172 receives input of the digital data of the battery temperature that has been output from the second temperature monitoring sensor 134, and compares it with the battery temperature threshold value 166 of the set flag memory 108. When the battery temperature is higher than or equal to the battery temperature threshold value 166, the battery temperature monitoring unit 172 sets the charging voltage flag 167 of the set flag memory 108 to LOW. Also, when the battery temperature is lower than the battery temperature threshold value 166, the battery temperature monitoring unit 172 sets the charging voltage flag 167 of the set flag memory 108 to HIGH. By this process, the charging control unit 174 instructs the charging circuit 128 to supply to the battery 136 the first voltage value or the second voltage value of the charging voltage 168 respectively corresponding to HIGH or LOW of the charging voltage flag 167 of the set flag memory 108.

The charging control unit 174 instructs the charging circuit 128 to perform supply and control of the charging electric current and the charging voltage to the battery 136. As has been described above, the charging control unit 174 instructs the charging circuit 128 as to the charging electric current and the charging voltage to be supplied to the battery 136 in accordance with the charging electric current flag 163 that has been set by the device temperature monitoring unit 170, the charging voltage flag 167 that has been set by the battery temperature monitoring unit 172, and the like.

The battery voltage monitoring unit 176 monitors the battery voltage of the charging circuit 128, and informs the charging control unit 174. The battery voltage monitoring unit 176 monitors whether or not the voltage of the battery 136 is higher than or equal to the battery voltage threshold value 160 of the set flag memory 108 and, when the voltage of the battery 136 is higher than or equal to the battery voltage threshold value 160, the battery voltage monitoring unit 176 informs the charging control unit 174 to stop the charging.

Figure 5:
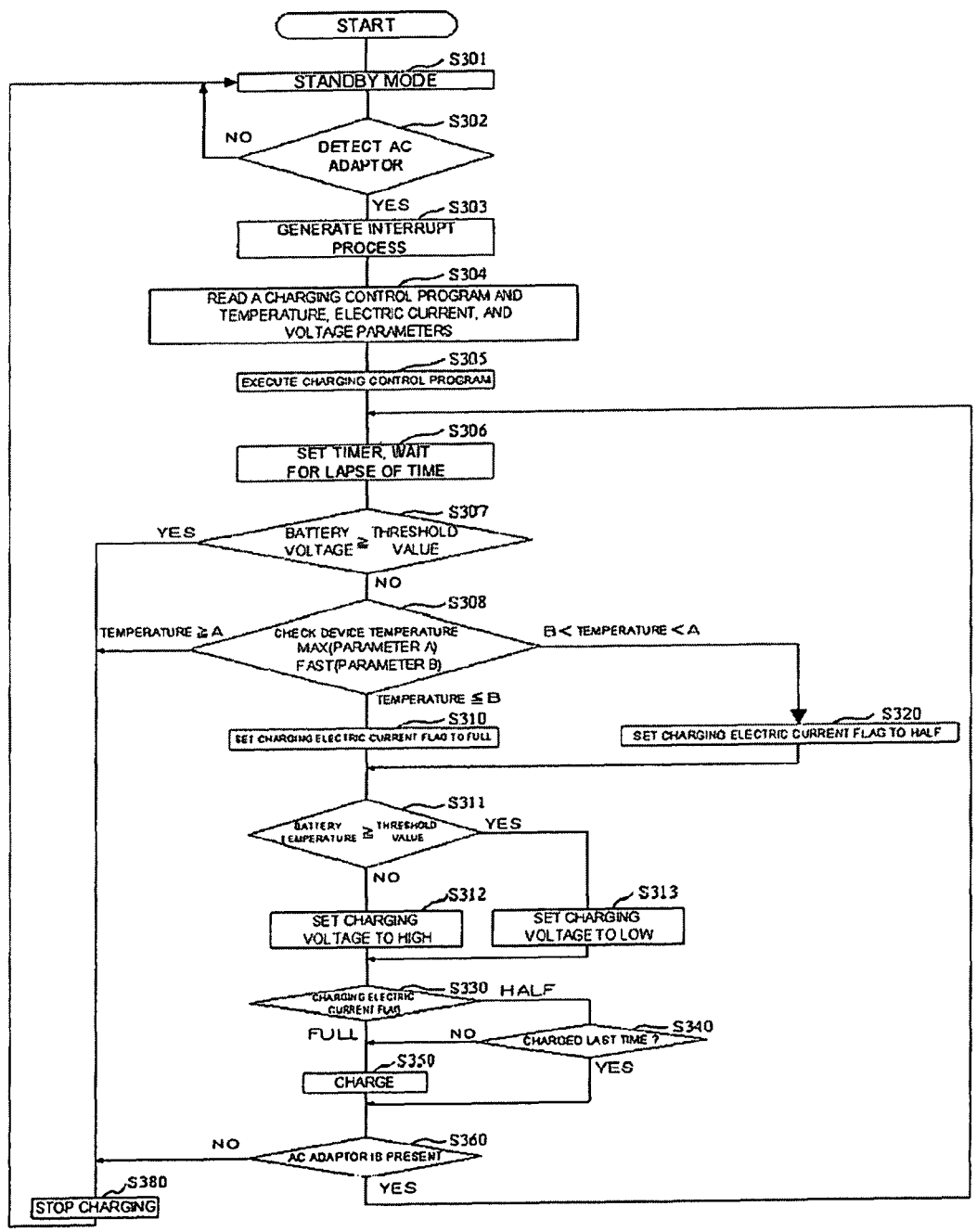
FIG. 5 is a flowchart showing one example of an operation of the charging system of the present exemplary embodiment.

The operation of the charging system 200 of the present exemplary embodiment constructed in this manner will be described below. FIG. 5 is a flowchart showing one example of the operation of the charging system 200 of the present exemplary embodiment.

First, it is assumed that the portable telephone 100 is in a standby mode (step S301). Then, the user connects the AC adaptor 201 to the charging connector 132. During this time, it is assumed that the AC adaptor 201 is connected to an AC power source. Then, upon detecting connection to the AC adaptor 201 in the standby mode (YES in the step S302), the insertion and remove detecting circuit 130 informs the interrupt controller 110. Upon receipt of the information, the interrupt controller 110 generates an interrupt to the CPU 102 (step S303). By this interruption, the CPU 102 reads the charging control program of the present exemplary embodiment out from the ROM 104, reads the temperature, electric current, and voltage parameters out from the set flag memory 108, and stores them into the work memory 106 (step S304). Then, the CPU 102 executes the charging control program (step S305).

Here, the CPU 102 sets the timer 126 (step S306), and operates to execute the following steps after each lapse of a predetermined period of time.

After the predetermined period of time passes, the battery voltage monitoring unit 176 obtains the voltage of the battery 136 from the charging circuit 128, and judges whether or not the voltage is higher than or equal to the battery voltage threshold value 160 of the set flag memory 108 (step S307). When the voltage of the battery 136 is higher than or equal to the battery voltage threshold value 160, the battery voltage monitoring unit 176 judges that the battery is fully charged (YES in the step S307), and informs the charging control unit 174 to stop the charging (step S380).

On the other hand, when the voltage of the battery 136 is lower than the battery voltage threshold value 160 (NO in the step S307), the battery voltage monitoring unit 176 informs the charging control unit 174 of that effect, and proceeds to the device temperature and battery temperature control in the device temperature monitoring unit 170 and the battery temperature monitoring unit 172, respectively.

First, the first temperature monitoring sensor 124 measures the device temperature, and the device temperature monitoring unit 170 obtains the device temperature from the first temperature monitoring sensor 124 and compares it with the parameter values of the device temperature 162 of the set flag memory 108 (step S308).

When the device temperature is lower than or equal to the parameter B (FAST) of the device temperature 162 (temperature≦B in the step S308), it is a state in which high-speed charging is possible, so that the charging electric current flag 163 of the set flag memory 108 is set to FULL (step S310).

Also, when the device temperature is lower than the parameter A (MAX) of the device temperature 162 and is higher than the parameter B (FAST) of the device temperature 162 (B<temperature<A in the step S308), it is a state in which low-speed charging is possible, so that the charging electric current flag 163 of the set flag memory 108 is set to HALF (step S320).

Here, low-speed charging refers to execution of a charging process for every other cycle in accordance with the cycle of performing a series of sequences following the step S307 that is executed for each lapse of time that is measured by the timer 126 in the step S306.

Also, when the device temperature is higher than or equal to the parameter A (MAX) of the device temperature 162 (temperature≧A in the step S308), the flow proceeds to the step S380.

In the step S380, the charging control unit 174 instructs the charging circuit 128 to stop the charging. Here, after the step S308, the flow returns to the step S301, and stops the charging process until the AC adaptor 201 is connected again in the standby mode of the portable telephone 100.

Successively after the step S310 or the step S320, namely, after the charging electric current flag 163 is set, the battery temperature monitoring unit 172 performs checking of the battery temperature (step S311). The second temperature monitoring sensor 134 outputs the battery temperature, and the battery temperature monitoring unit 172 then obtains it and compares it with the battery temperature threshold value 166 of the set flag memory 108. When the battery temperature is lower than the temperature threshold value 166 (NO in the step S311), the battery temperature monitoring unit 172 sets the charging voltage flag 167 to HIGH (step S312).

On the other hand, when the battery temperature is higher than or equal to the battery temperature threshold value 166 (YES in the step S311), the battery temperature monitoring unit 172 sets the charging voltage flag 167 to LOW (step S313). After the step S312 or the step S313, namely, after setting the charging voltage flag 167, the charging control unit 174 makes reference to the charging electric current flag 163 of the set flag memory 108. When the charging electric current flag 163 is FULL (FULL in the step S330), the flow proceeds to the step S350 where the charging control unit 174 instructs the charging circuit 128 to perform charging.

On the other hand, when the charging electric current flag 163 is HALF (HALF in the step S330), the charging control unit 174 makes reference to the charging flag 165 to check whether or not the charging was carried out at the last time. When the charging flag 165 has been set, the charging was carried out at the last time (YES in the step S340), and the charging process of the step S350 is then bypassed. Then, the charging flag 165 is reset. On the other hand, when the charging flag 165 has been reset, the charging was not carried out at the last time (NO in the step S340), so that the flow proceeds to the step S350 where the charging control unit 174 instructs the charging circuit 128 to perform charging. Then, the charging flag 165 is set.

In accordance with an instruction from the charging control unit 174, the charging circuit 128 controls the charging electric current and the charging voltage for supply to the battery 136. For example, the first electric current value or the second electric current value of the charging electric current 164 respectively corresponding to FULL or HALF of the charging electric current flag 163 according to the result of judgment of the step S308 and the first voltage value or the second voltage value of the charging voltage 168 respectively corresponding to HIGH or LOW of the charging voltage flag 167 according to the result of judgment of the step S311 are supplied to the battery 136 (step S350).

Figure 6:
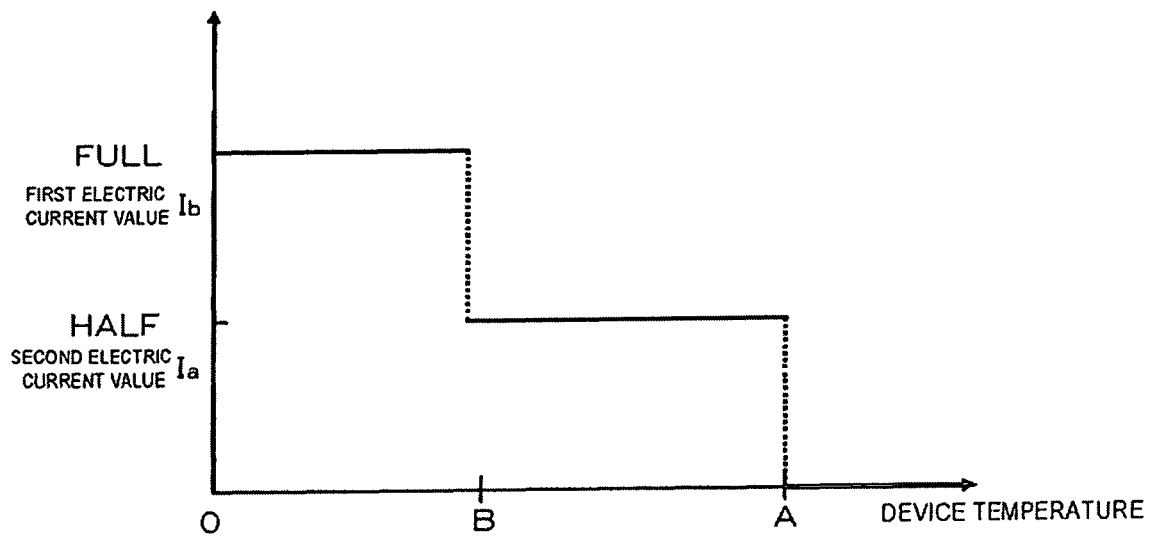
FIG. 6 is a view showing a relationship of the device temperature and the battery temperature relative to the charging electric current and the charging voltage in the charging system of the present exemplary embodiment.
Figure 6:
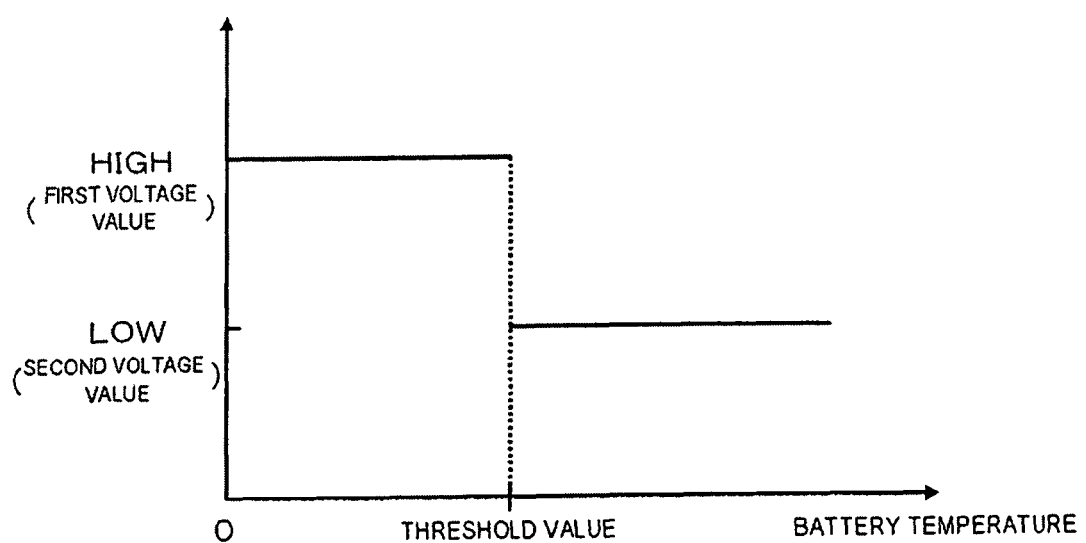

For example, as shown in FIG. 6(a), according to the charging system 200 of the present exemplary embodiment, when the device temperature is lower than or equal to the parameter B, the charging electric current flag 163 is set to FULL, and the charging electric current of the first electric current value Ib is supplied. Also, when the device temperature is lower than the parameter A and higher than the parameter B, the charging electric current flag 163 is set to HALF, and the charging electric current of the second electric current value Ia is supplied. When the device temperature is higher than or equal to the parameter A, the charging is stopped.

Also, as shown in FIG. 6(b), according to the charging system 200 of the present exemplary embodiment, when the battery temperature is lower than the battery temperature threshold value 166, the charging voltage flag 167 is set to HIGH, and the charging voltage is supplied with the first voltage value. Also, when the battery temperature is higher than or equal to the battery temperature threshold value 166, the charging voltage flag 167 is set to LOW, and the charging voltage is supplied with the second voltage value.

Returning to FIG. 5, after the charging of the step S350 or subsequent to YES in the step S340, the insertion and remove detecting circuit 130 confirms whether the AC adaptor 201 is connected or not (step S360). When the connection is established (YES in the step S360), the flow returns to the step S306, where the timer 126 is set again to wait for the lapse of a predetermined period of time, and then repeats the following steps until the flow comes to the step S380.

On the other hand, when the AC adaptor 201 is not connected (NO in the step S360), the flow proceeds to the step S380, where the charging control unit 174 is informed of that effect, and the charging is then stopped.

As described above, according to the charging system 200 of the exemplary embodiment of the present invention, the user can use a portable telephone that may use a lithium ion battery having a large capacity, can restrain the device temperature to be the set value and also can shorten the charging time, thereby restraining the deterioration of the lifetime.

It is apparent that the present invention is not limited to the above exemplary embodiment, that may be modified and changed without departing from the scope and spirit of the invention.

For example, the charging system 200 may include a temperature-corresponding electric current value storage unit (the set flag memory 108) that stores electric current values in correspondence with a plurality of set temperatures of the device temperature. The charging control unit 174 obtains, from the temperature-corresponding electric current value storage unit (the set flag memory 108), the electric current value corresponding to the device temperature that is monitored by the first temperature monitoring unit (the charging control unit 174) so as to control the charging electric current to be supplied to the battery 136.

Figure 7:
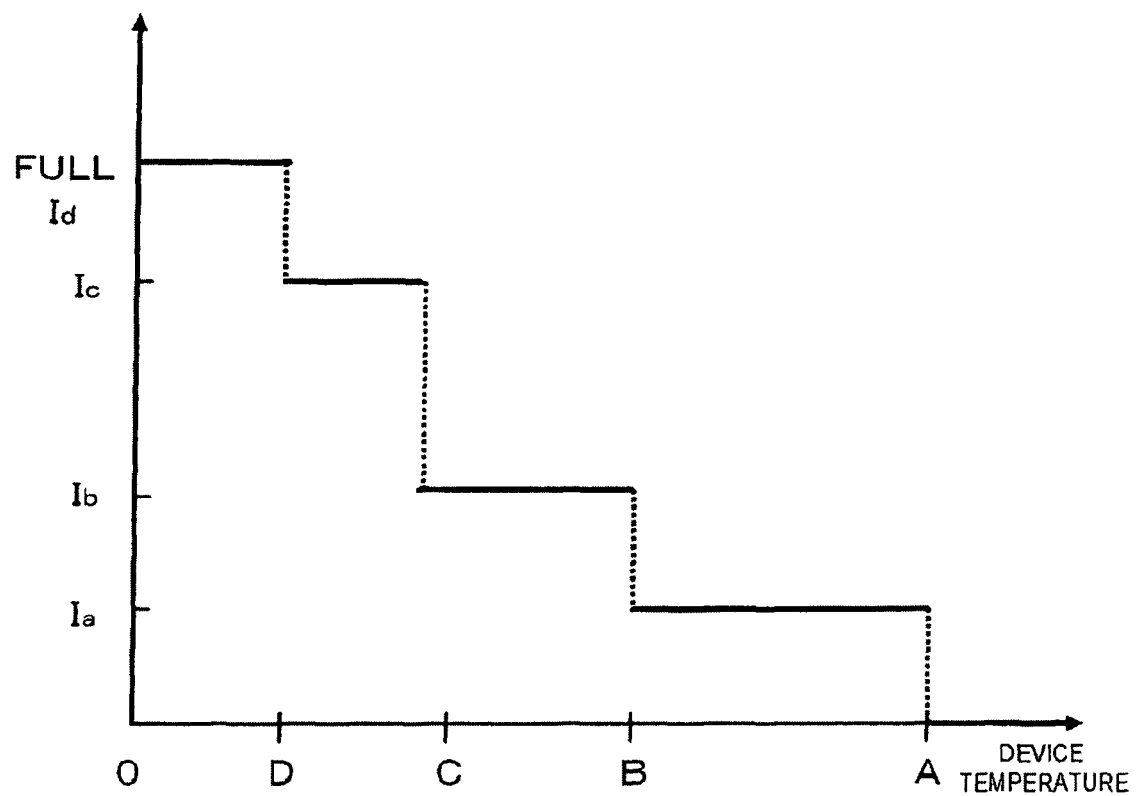
FIG. 7 is a view illustrating a multiple-stage control of the charging electric current according to the device temperature in a charging system of another exemplary embodiment.

For example, as shown in FIG. 7, a plurality of set temperatures of the device temperature (parameters A, B, C, and D. Here, it is assumed that A>B>C>D.) are stored in the device temperature 162 of the set flag memory 108, while a plurality of electric current values (Ia, Ib, Ic, and Id. Here, it is assumed that Ia<Ib<Ic<Id.) corresponding the plurality of set temperatures of the device temperature are stored in the charging electric current 164 of the set flag memory 108. Thus, as shown in FIG. 7, the charging electric current can be controlled at multiple stages in accordance with the device temperature.

Also, in the above-described charging system, the temperature-corresponding electric current value storage unit (the set flag memory 108) may store a plurality of electric current values respectively corresponding to the plurality of set temperatures of the device temperature, and cycle numbers of the lapse of a predetermined period of time of the timer 126 respectively corresponding to the plurality of the set temperatures. For every lapse of the predetermined period of time by the timer 126, the first temperature monitoring unit (the device temperature monitoring unit 170) may monitor the device temperature; and the charging control unit 174 may make access to the temperature-corresponding electric current value storage unit (the set flag memory 108), may obtain the electric current value of the charging electric current and the cycle number according to the set temperature corresponding to the device temperature, and may control to perform or stop supply of the electric current value of the charging electric current to the battery each for the cycle number.

According to this construction, the charging cycle also can be set in a fine manner in the multiple-stage control of the charging electric current by temperature.

Alternatively, in another exemplary embodiment, the charging electric current may be defined as a function of the device temperature.

Also, in another exemplary embodiment, a temperature-corresponding voltage value storage unit (the set flag memory 108) that stores voltage values in correspondence with a plurality of set temperatures of the battery temperature may be provided. The charging control unit 174 may obtain, from the temperature-corresponding voltage value storage unit (the set flag memory 108), the voltage value corresponding to the battery temperature that is monitored by the second temperature monitoring unit (the battery temperature monitoring unit 172) so as to control the charging voltage to be supplied to the battery 136.

According to this construction, the charging voltage can be controlled at multiple stages in accordance with the battery temperature.

The invention claimed is:

1. A charging system for charging a battery mounted on a portable terminal, comprising:
   a charging control unit that performs supply and control of a charging electric current and a charging voltage to said battery;
   a first temperature monitoring unit that monitors a device temperature inside said portable terminal; and
   a second temperature monitoring unit that monitors a battery temperature of said battery,
   wherein said charging control unit controls said charging electric current to be supplied to said battery according to said device temperature monitored by said first temperature monitoring unit and controls said charging voltage to be supplied to said battery according to said battery temperature monitored by said second temperature monitoring unit,
   the charging system further comprises:
   a temperature-corresponding electric current value storing unit that stores electric current values in correspondence with a plurality of set temperatures of said device temperature, wherein said charging control unit obtains, from said temperature-corresponding electric current value storing unit, an electric current value corresponding to said device temperature monitored by said first temperature monitoring unit, so as to control said charging electric current to be supplied to said battery; and
   a timer that monitors lapse of a predetermined period of time,
   wherein said temperature-corresponding electric current value storing unit stores said plurality of set temperatures of said device temperature including a first set temperature and a second set temperature lower than said first set temperature, and a first electric current value and a second electric current value respectively corresponding to said first set temperature and said second set temperature and the second electric current value being higher than the first electric current value,
   said first temperature monitoring unit monitors said device temperature each time said predetermined period of time monitored by said timer passes, and
   said charging control unit:
   makes access to said temperature-corresponding electric current value storing unit,
   supplies to said battery a charging electric current of said second electric current value for each cycle of lapse of said predetermined period of time of said timer when said device temperature is lower than or equal to said second set temperature,
   supplies to said battery a charging electric current of said first electric current value for every other cycle of lapse of said predetermined period of time of said timer when said device temperature is lower than said first set temperature and higher than said second set temperature, and
   stops supply of said charging electric current when said device temperature is higher than or equal to said first set temperature.

2. The charging system as set forth in claim 1, comprising a temperature-corresponding voltage value storing unit that stores voltage values in correspondence with a plurality of set temperatures of said battery temperature,
   wherein said charging control unit obtains, from said temperature-corresponding voltage value storing unit, a voltage value corresponding to said battery temperature monitored by said second temperature monitoring unit, so as to control said charging voltage to be supplied to said battery.

3. The charging system as set forth in claim 1, wherein said battery is a lithium ion battery.

4. A non-transitory computer-readable data storage medium storing a charging control program for controlling a charging circuit that charges a battery mounted on a portable terminal,
   said charging control program allowing a computer to function as:
   means for monitoring a device temperature inside said portable terminal,
   means for monitoring a battery temperature of said battery,
   means for controlling a charging electric current to be supplied to said battery according to said device temperature monitored by said means for monitoring said device temperature, and
   means for controlling a charging voltage to be supplied to said battery according to said battery temperature monitored by said means for monitoring said battery temperature,
   the charging control program further allow the computer to function as:
   a temperature-corresponding electric current value storing means for storing electric current values in correspondence with a plurality of set temperatures of said device temperature, wherein said means for controlling the charging electric current obtains, from said temperature-corresponding electric current value storing means, an electric current value corresponding to said device temperature monitored by said means for monitoring the device temperature, so as to control said charging electric current to be supplied to said battery; and
   a timer that monitors lapse of a predetermined period of time,
   wherein said temperature-corresponding electric current value storing means stores said plurality of set temperatures of said device temperature including a first set temperature and a second set temperature lower than said first set temperature, and a first electric current value and a second electric current value respectively corresponding to said first set temperature and said second set temperature and the second electric current value being higher than the first electric current value,
   said means for monitoring the device temperatures monitors said device temperature each time said predetermined period of time monitored by said timer passes, and
   said means for controlling the charging electric current:
   makes access to said temperature-corresponding electric current value storing means,
   supplies battery a charging electric current of said second electric current value for each cycle of lapse of said predetermined period of time of said timer when said device temperature is lower than or equal to said second set temperature,
   supplies battery a charging electric current of said first electric current value for every other cycle of lapse of said predetermined period of time of said timer when said device temperature is lower than said first set temperature and higher than said second set temperature, and
   stops supply of said charging electric current when said device temperature is higher than or equal to said first set temperature.

5. The non-transitory computer-readable data storage medium as set forth in claim 4,
wherein said computer comprises a temperature-corresponding voltage value storing unit that stores voltage values in correspondence with a plurality of set temperatures of said battery temperature,
said charging control program allowing said computer to function as means for obtaining, from said temperature-corresponding voltage value storing unit, a voltage value corresponding to said battery temperature monitored by said means for monitoring said battery temperature, so as to control said charging voltage to be supplied to said battery.

6. The non-transitory computer-readable data storage medium as set forth in claim 4,
wherein said battery is a lithium ion battery.

7. A portable terminal comprising:
a housing in which electronic components are incorporated;
a battery that is provided in said housing;
a charging circuit capable of supplying a charging electric current and a charging voltage to said battery;
a charging control unit that controls execution and stoppage of charging said battery using said charging circuit;
a first temperature sensor that senses an inside temperature of said housing; and
a second temperature sensor that senses a battery temperature of said battery,
wherein said charging control unit adjusts said charging electric current to be supplied to said battery according to a first temperature sensed by said first temperature sensor, and adjusts said charging voltage to be supplied to said battery according to a second temperature sensed by said second temperature sensor,
the charging system further comprises:
a temperature-corresponding electric current value storing unit that stores electric current values in correspondence with a plurality of set temperatures of said first temperature, wherein said charging control unit obtains, from said temperature-corresponding electric current value storing unit, an electric current value corresponding to said first temperature monitored by said first temperature sensor, so as to control said charging electric current to be supplied to said battery; and
a timer that monitors lapse of a predetermined period of time,
wherein said temperature-corresponding electric current value storing unit stores said plurality of set temperatures of said first temperature including a first set temperature and a second set temperature lower than said first set temperature, and a first electric current value and a second electric current value respectively corresponding to said first set temperature and said second set temperature and the second electric current value being higher than the first electric current value,
said first temperature sensor monitors said first temperature each time said predetermined period of time monitored by said timer passes, and
said charging control unit:
makes access to said temperature-corresponding electric current value storing unit,
supplies battery a charging electric current of said second electric current value for each cycle of lapse of said predetermined period of time of said timer when said first temperature is lower than or equal to said second set temperature,
supplies battery a charging electric current of said first electric current value for every other cycle of lapse of said predetermined period of time of said timer when said first temperature is lower than said first set temperature and higher than said second set temperature, and
stops supply of said charging electric current when said first temperature is higher than or equal to said first set temperature.

8. The portable terminal as set forth in claim 7,
wherein said charging control unit sets said charging electric current to have a first electric current value when the temperature sensed by said first temperature sensor is higher than an electric current setting switching temperature that is set in advance, and sets said charging electric current to have a second electric current value higher than said first electric current value when the temperature sensed by said first temperature sensor is lower than said electric current setting switching temperature, and
said charging control unit sets said charging voltage to have a first voltage value when the temperature sensed by said second temperature sensor is higher than a voltage switching temperature that is set in advance, and sets said charging voltage to have a second voltage value larger than said first voltage value when the temperature sensed by said second temperature sensor is lower than said voltage switching temperature.

9. A charging method of charging a battery mounted on a portable terminal, comprising:
performing supply and control of a charging electric current and a charging voltage to said battery;
monitoring a device temperature inside said portable terminal; and
monitoring a battery temperature of said battery,
wherein said performing has controlling said charging electric current to be supplied to said battery according to said device temperature monitored in said monitoring, and controlling said charging voltage to be supplied to said battery according to said battery temperature monitored in said monitoring,
the charging method further comprises:
storing electric current values in correspondence with a plurality of set temperatures of said device temperature;
obtaining an electric current value corresponding to said device temperature, so as to control said charging electric current to be supplied to said battery;
monitoring lapse of a predetermined period of time,
wherein said plurality of set temperatures include a first set temperature and a second set temperature lower than said first set temperature, and said electric current values include a first electric current value and a second electric current value respectively corresponding to said first set temperature and said second set temperature, and the second electric current value being higher than the first electric current value,
wherein said monitoring said device temperature is performed each time said predetermined period of time monitored passes;
supplying to said battery a charging electric current of said second electric current value for each cycle of lapse of said predetermined period of time when said device temperature is lower than or equal to said second set temperature;
supplying to said battery a charging electric current of said first electric current value for every other cycle of lapse of said predetermined period of time when said device temperature is lower than said first set temperature and higher than said second set temperature, and stopping supply of said charging electric current when said device temperature is higher than or equal to said first set temperature.

10. The charging method as set forth in claim 9, wherein said portable terminal comprises a temperature-corresponding voltage value storing unit that stores voltage values in correspondence with a plurality of set temperatures of said battery temperature, wherein said performing has obtaining, from said temperature-corresponding voltage value storing unit, a voltage value corresponding to said battery temperature monitored in said monitoring, so as to control said charging voltage to be supplied to said battery.

11. The charging method as set forth in claim 9, wherein said portable terminal uses a lithium ion battery as said battery.

12. A charging system for charging a battery mounted on a portable terminal, comprising:

a charging control unit that performs supply and control of a charging electric current and a charging voltage to said battery;

a first temperature monitoring unit that monitors a device temperature inside said portable terminal; and a second temperature monitoring unit that monitors a battery temperature of said battery, wherein said charging control unit controls said charging electric current to be supplied to said battery according to said device temperature monitored by said first temperature monitoring unit and controls said charging voltage to be supplied to said battery according to said battery temperature monitored by said second temperature monitoring unit, the charging system further comprises:

a temperature-corresponding electric current value storing unit that stores electric current values in correspondence with a plurality of set temperatures of said device temperature, wherein said charging control unit obtains, from said temperature-corresponding electric current value storing unit, an electric current value corresponding to said device temperature monitored by said first temperature monitoring unit, so as to control said charging electric current to be supplied to said battery; and a timer that monitors lapse of a predetermined period of time, wherein said temperature-corresponding electric current value storing unit stores a plurality of electric current values respectively corresponding to said plurality of set temperatures of said device temperature, and cycle numbers of lapse of said predetermined period of time of said timer respectively corresponding to said plurality of set temperatures, said first temperature monitoring unit monitors said device temperature each time said predetermined period of time monitored by said timer passes, and said charging control unit:

makes access to said temperature-corresponding electric current value storing unit, obtains an electric current value of said charging electric current and a cycle number according to said set temperature corresponding to said device temperature, and controls to perform or stop supply of said charging electric current of said electric current value to said battery each for said cycle number.

13. The charging system as set forth in claim 12, comprising a temperature-corresponding voltage value storing unit that stores voltage values in correspondence with a plurality of set temperatures of said battery temperature, wherein said charging control unit obtains, from said temperature-corresponding voltage value storing unit, a voltage value corresponding to said battery temperature monitored by said second temperature monitoring unit so as to control said charging voltage to be supplied to said battery.

14. The charging system as set forth in claim 12, wherein said battery is a lithium ion battery.

15. A non-transitory computer-readable data storage medium storing charging control program for controlling a charging circuit that charges a battery mounted on a portable terminal, said charging control program allowing a computer to function as:

charging control means for performing supply and control of a charging electric current and a charging voltage to said battery;

first temperature monitoring means for monitoring a device temperature inside said portable terminal; and second temperature monitoring means for monitoring a battery temperature of said battery, wherein said charging control means controls said charging electric current to be supplied to said battery according to said device temperature monitored by said first temperature monitoring means and controls said charging voltage to be supplied to said battery according to said battery temperature monitored by said second temperature monitoring means, the charging system further comprises:

temperature-corresponding electric current value storing means for storing electric current values in correspondence with a plurality of set temperatures of said device temperature, wherein said charging control means obtains, from said temperature-corresponding electric current value storing means, an electric current value corresponding to said device temperature monitored by said first temperature monitoring means, so as to control said charging electric current to be supplied to said battery; and a timer that monitors lapse of a predetermined period of time, wherein said temperature-corresponding electric current value storing means stores a plurality of electric current values respectively corresponding to said plurality of set temperatures of said device temperature, and cycle numbers of lapse of said predetermined period of time of said timer respectively corresponding to said plurality of set temperatures, said first temperature monitoring means monitors said device temperature each time said predetermined period of time monitored by said timer passes, and said charging control means:

makes access to said temperature-corresponding electric current value storing means, obtains an electric current value of said charging electric current and a cycle number according to said set temperature corresponding to said device temperature, and controls to perform or stop supply of said charging electric current of said electric current value to said battery each for said cycle number.

16. The non-transitory computer-readable data storage medium as set forth in claim 15, comprising a temperature-corresponding voltage value storing unit that stores voltage values in correspondence with a plurality of set temperatures of said battery temperature, wherein said charging control unit obtains, from said temperature-corresponding voltage value storing unit, a voltage value corresponding to said battery temperature monitored by said second temperature monitoring unit so as to control said charging voltage to be supplied to said battery.

17. The non-transitory computer-readable data storage medium as set forth in claim 15,
wherein said battery is a lithium ion battery.

18. A portable terminal comprising:
a housing in which electronic components are incorporated;
a battery that is provided in said housing;
a charging circuit capable of supplying a charging electric current and a charging voltage to said battery;
a charging control unit that controls execution and stoppage of charging said battery using said charging circuit;
a first temperature sensor that senses an inside temperature of said housing; and
a second temperature sensor that senses a battery temperature of said battery,
wherein said charging control unit adjusts said charging electric current to be supplied to said battery according to a first temperature sensed by said first temperature sensor, and adjusts said charging voltage to be supplied to said battery according to a second temperature sensed by said second temperature sensor,
the portable terminal further comprises:
a temperature-corresponding electric current value storing unit that stores electric current values in correspondence with a plurality of set temperatures of said first temperature, wherein said charging control unit obtains, from said temperature-corresponding electric current value storing unit, an electric current value corresponding to said first temperature monitored by said first temperature sensor, so as to control said charging electric current to be supplied to said battery; and
a timer that monitors lapse of a predetermined period of time,
wherein said temperature-corresponding electric current value storing unit stores a plurality of electric current values respectively corresponding to said plurality of set temperatures of said first temperature, and cycle numbers of lapse of said predetermined period of time of said timer respectively corresponding to said plurality of set temperatures,
said first temperature monitoring unit monitors said first temperature each time said predetermined period of time monitored by said timer passes, and
said charging control unit:
makes access to said temperature-corresponding electric current value storing unit,
obtains an electric current value of said charging electric current and a cycle number according to said set temperature corresponding to said first temperature, and
controls to perform or stop supply of said charging electric current of said electric current value to said battery each for said cycle number.

19. The portable terminal as set forth in claim 18, comprising a temperature-corresponding voltage value storing unit that stores voltage values in correspondence with a plurality of set temperatures of said second temperature,
wherein said charging control unit obtains, from said temperature-corresponding voltage value storing unit, a voltage value corresponding to said second temperature monitored by said second temperature sensor so as to control said charging voltage to be supplied to said battery.

20. The portable terminal as set forth in claim 18,
wherein said battery is a lithium ion battery.

21. A charging method of charging a battery mounted on a portable terminal, comprising:
performing supply and control of a charging electric current and a charging voltage to said battery;
monitoring a device temperature inside said portable terminal; and
monitoring a battery temperature of said battery,
wherein said performing has controlling said charging electric current to be supplied to said battery according to said device temperature monitored in said monitoring, and controlling said charging voltage to be supplied to said battery according to said battery temperature monitored in said monitoring,
the method further comprises:
storing electric current values in correspondence with a plurality of set temperatures of said device temperature;
obtaining an electric current value corresponding to said device temperature, so as to control said charging electric current to be supplied to said battery;
monitoring lapse of a predetermined period of time,
wherein said electric current values respectively correspond to said plurality of set temperatures of said device temperature, and cycle numbers of lapse of said predetermined period of time respectively correspond to said plurality of set temperatures,
wherein said monitoring said device temperature is performed each time said predetermined period of time monitored passes;
obtaining an electric current value of said charging electric current and a cycle number according to said set temperature corresponding to said device temperature; and,
controlling to perform or stop supply of said charging electric current of said electric current value to said battery each for said cycle number.

22. The charging method as set forth in claim 21, comprising:
storing voltage values in correspondence with a plurality of set temperatures of said second temperature;
obtaining a voltage value corresponding to said second temperature monitored so as to control said charging voltage to be supplied to said battery.

23. The charging method as set forth in claim 21,
wherein said battery is a lithium ion battery.

* * * * *